United States Patent
Iwase et al.

(10) Patent No.: US 11,654,835 B2
(45) Date of Patent: May 23, 2023

(54) REAR SEAT DISPLAY DEVICE

(71) Applicant: DENSO TEN Limited, Kobe (JP)

(72) Inventors: Miho Iwase, Kobe (JP); Masahiro Koharazawa, Kobe (JP)

(73) Assignee: DENSO TEN Limited, Kobe (JP)

( * ) Notice: Subject to any disclaimer, the term of this patent is extended or adjusted under 35 U.S.C. 154(b) by 227 days.

(21) Appl. No.: 17/160,613

(22) Filed: Jan. 28, 2021

(65) Prior Publication Data
US 2021/0237660 A1  Aug. 5, 2021

(30) Foreign Application Priority Data

Feb. 4, 2020  (JP) .............................. JP2020-016953

(51) Int. Cl.
*B60R 11/02* (2006.01)
*B60K 35/00* (2006.01)

(52) U.S. Cl.
CPC .......... *B60R 11/0235* (2013.01); *B60K 35/00* (2013.01); *B60R 11/0217* (2013.01); *B60K 2370/152* (2019.05)

(58) Field of Classification Search
CPC . B60R 11/0235; B60R 11/0217; B60K 35/00; B60K 2370/152
USPC ....................................................... 297/217.3
See application file for complete search history.

(56) References Cited

U.S. PATENT DOCUMENTS

| 7,983,203 B2* | 7/2011 | Kakani ................ H04W 28/06 370/312 |
| 8,031,880 B2* | 10/2011 | Holmi ..................... H04S 7/307 381/103 |
| 9,013,640 B2* | 4/2015 | Strohmaier .......... H04N 21/485 348/837 |
| 2003/0053638 A1* | 3/2003 | Yasuhara ................. H04R 5/04 381/86 |
| 2005/0032500 A1* | 2/2005 | Nashif ..................... H04R 5/02 455/344 |
| 2017/0048606 A1* | 2/2017 | Fan .......................... H04S 7/30 |
| 2021/0306752 A1* | 9/2021 | Yoshida ............... H04N 21/439 |

FOREIGN PATENT DOCUMENTS

| JP | 2006-248253 A | 9/2006 |
| JP | 2008-288731 A | 11/2008 |

* cited by examiner

*Primary Examiner* — Mark R Wendell
(74) *Attorney, Agent, or Firm* — Oliff PLC

(57) ABSTRACT

A rear seat display device is provided in a vehicle at a position viewable from a rear seat of the vehicle. The rear seat display device includes a display, a built-in speaker, and a controller that (i) acquires a signal relating to control of a sound to be output to a vehicle speaker mounted in the vehicle from an in-vehicle audio device, the vehicle speaker being a different speaker than the built-in speaker, and (ii) controls a sound to be output from the built-in speaker based on the signal relating to the control of the sound.

6 Claims, 6 Drawing Sheets

REAR SEAT DISPLAY DEVICE

BACKGROUND OF THE INVENTION

Field of the Invention

The invention relates to a rear seat display device, an in-vehicle system, and a control method thereof.

Description of the Background Art

With a recent ICT (Information and Communication Technology) development, a vehicle that includes an in-vehicle rear seat display is becoming popular (for example, refer to Japanese Published Unexamined Patent Application Nos. 2008-288731 and 2006-248253). The in-vehicle rear seat display constitutes an RSE (Rear Seat Entertainment) system in the vehicle together with an in-vehicle audio device, and the like, that provide a TV broadcast, and a video recorded on a DVD, etc. Examples of such an in-vehicle audio device include, for example, an AVN equipment (in-vehicle audio, visual and navigation equipment) that provides a navigation function, an audio function, a TV/radio broadcast receiving function, an image reproduction function, a communication function, and the like. The in-vehicle audio device is, for example, provided in a center console on a driver's seat side, and the like. An occupant that sits on a rear seat, for example, can enjoy contents such as the TV broadcast and the DVD video that are output from the in-vehicle audio device to the in-vehicle rear seat display through the in-vehicle rear seat display provided substantially on a central portion in a vehicle width of a rear seat ceiling in the vehicle.

By the way, in the RSE system constituted in the vehicle, sound and the like (music, sound effect, conversation sound, etc.) of the contents that are displayed on the in-vehicle rear seat display are mainly provided using a speaker (hereinafter, referred to as a vehicle speaker) that is included in the vehicle. The vehicle speaker is, for example, provided on a lower inner side (vehicle cabin side) of each door corresponding to a right side of the driver's seat, a left side of a passenger seat, a right side of a rear seat behind the driver's seat and a left side of a rear seat behind the passenger seat. Thus, when the sound and the like of the contents are output through the vehicle speaker, in some cases, it is not possible to provide a sense of unity and presence between the video of the contents displayed on the in-vehicle rear seat display and the sound to be output from the speaker and accompanies the video.

SUMMARY OF THE INVENTION

According to one aspect of the invention, a rear seat display device is provided in a vehicle at a position viewable from a rear seat of the vehicle. The rear seat display device includes a display, a built-in speaker, and a controller that (i) acquires a signal relating to control of a sound to be output to a vehicle speaker mounted in the vehicle from an in-vehicle audio device, the vehicle speaker being a different speaker than the built-in speaker, and (ii) controls a sound to be output from the built-in speaker based on the signal relating to the control of the sound.

It is an object of the invention to provide an in-vehicle rear seat display device capable of providing contents that bring a sense of unity and presence between a video and a sound in a vehicle.

These and other objects, features, aspects and advantages of the invention will become more apparent from the following detailed description of the invention when taken in conjunction with the accompanying drawings.

DESCRIPTION OF THE EMBODIMENTS

An in-vehicle system according to one embodiment will be described below with reference to the drawings. A configuration of the embodiment is merely an example and this in-vehicle system is not limited to the configuration of the embodiment.

EMBODIMENT

1. System Overview

Figure 1:
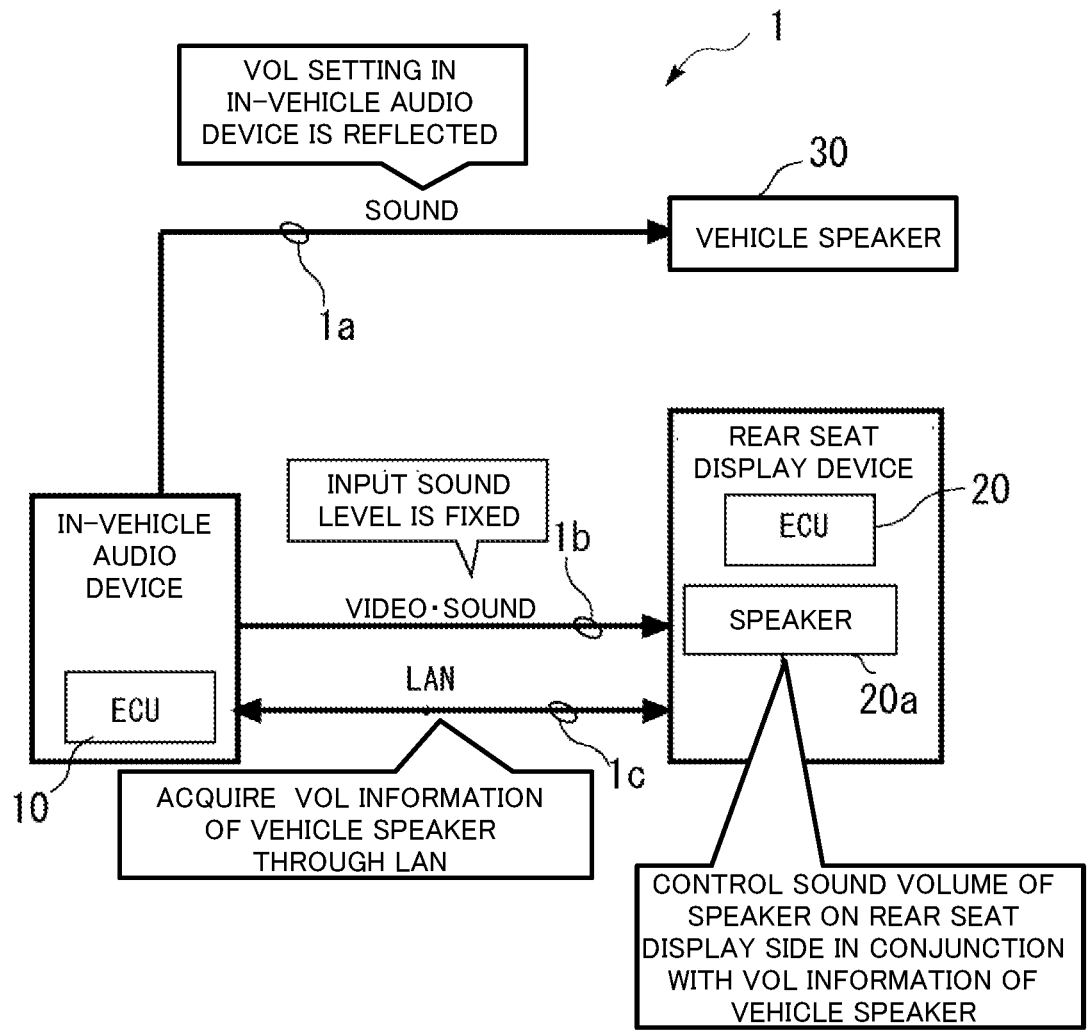
FIG. 1 is a diagram illustrating one example of a functional block of an in-vehicle system according to an embodiment.

FIG. 1 is a diagram illustrating one example of a functional block of an in-vehicle system 1 according to this embodiment. The in-vehicle system 1 according to this embodiment is an in-vehicle audio system that provides various contents such as a TV broadcast, a video recorded on a DVD, etc., and a game, to an occupant that sits on a rear seat using an in-vehicle rear seat display provided on a side of the rear seat in a vehicle. In the vehicle on which the in-vehicle system (also referred to as an information system) is mounted, an RSE (Rear Seat Entertainment) system is constituted. In the following description, the in-vehicle rear seat display is also referred to as "RSE" or "rear seat display", and a device that includes the display is referred to as "rear seat display device".

The in-vehicle system 1 according to this embodiment includes, as a component, a HU-ECU (Head Unit-Electronic Control Unit) 10 included in an in-vehicle audio device, an RSE-ECU (Rear Seat Entertainment-Electronic Control Unit) 20 included in the rear seat display device, and a vehicle speaker 30 provided on a vehicle body (e.g., on a vehicle cabin side of a door).

Examples of the in-vehicle audio device that is provided with the HU-ECU 10 include an AVN equipment that integrally provides a navigation function, an audio function, a TV/radio broadcast receiving function, an image reproduction function, a communication function, and the like. However, the in-vehicle audio device may be a navigation device that exclusively provides a navigation function or may be an audio device that exclusively provides an audio function and a reproduction function of contents information recorded on a CD (Compact Disc), a DVD (Digital Versatile Disc), etc. Furthermore, the in-vehicle device may be an audio device that cooperates with a smartphone, a tablet terminal, a music reproduction device, etc. of the occupant who gets on the vehicle and provides a game, an information search function, and the like. The in-vehicle device may provide video contents that are displayed on the in-vehicle rear seat display.

The HU-ECU 10 includes a sound processing function. In the in-vehicle audio device, a sound volume level of a sound, etc. of the contents to be provided is controlled based on a setting information (VOL setting) of sound volume set by the occupant, and the like. The HU-ECU 10 gradually increases/decreases the sound volume level of the vehicle speaker 30 provided on the vehicle body according to a step value of a set value of the sound volume adjustment. The HU-ECU 10 outputs the sound, etc. of the contents whose level value is adjusted according to the sound volume level to the vehicle speaker 30 connected by a harness cable 1*a*.

When a fader (front and rear)/balance (left and right) of a sound signal that is output to the vehicle speaker 30 is set in the in-vehicle audio device, the HU-ECU 10 increases/decreases a value of the sound volume level that is output to the vehicle speaker 30 according to the set value. For example, the HU-ECU 10 increases an output level from the vehicle speaker 30 provided on a right side of the driver's seat and decreases the output level from the vehicle speaker 30 provided on a left side of the driver's seat (left side of the passenger seat). The HU-ECU 10 outputs the sound, etc. of the contents whose value of the sound volume level is adjusted according to the set value of the fader/balance to the corresponding front, rear, left and right vehicle speakers 30 set by the fader/balance.

Furthermore, when the in-vehicle audio device has an equalizing function, the HU-ECU 10 acquires information indicating a sound range (high sound range, low sound range, middle sound range) set by an equalizer. The HU-ECU 10 acquires information (the value of the sound volume level, the step value for a sound volume adjustment, etc.) indicating a strength of the sound volume level for each sound range. The HU-ECU 10 outputs the sound, etc. of the contents whose sound volume level is increased/decreased according to the sound range set by the equalizer and the value of the sound volume adjustment for each sound range to the vehicle speakers 30.

The HU-ECU 10 and the RSE-ECU 20 are connected through a communication interface 1*b* provided in the vehicle. Examples of such a communication interface include a GVIF (Gigabit Video Interface). The GVIF is an I/F standard based on a SERDES standard to transmit a reproduced moving image such as a DVD or BD, a moving image on a TV broadcast such a terrestrial digital broadcasting, an in-vehicle camera video, and the like, in a high-speed digital transmission by a pair of differential signals. However, the communication interface through which the HU-ECU 10 and the RSE-ECU 20 are connected each other uses an appropriate communication system according to the in-vehicle system 1.

The HU-ECU 10 outputs a video of the contents that is displayed on the display, etc. of the in-vehicle audio device to the rear seat display device. The HU-ECU 10 outputs the sound signal (with fixed sound level value) for a speaker 20*a* included in the rear seat display device to the RSE-ECU 20 together with a video signal of the contents. The reproduced video of the contents is displayed on the display included in the rear seat display device, and the sound, etc. of the contents are output to a headphone terminal of the speaker 20*a* included in the rear seat display device.

In this embodiment, as described later, the HU-ECU 10 and the RSE-ECU 20 are connected through an-in-vehicle network 1*c* for an information communication such as an AVC-LAN (Audio Visual Communication-Local Area Network) provided in the vehicle. The in-vehicle network 1*c* through which the HU-ECU 10 and the RSE-ECU 20 are connected each other also uses an appropriate communication system according to the in-vehicle system 1.

Figure 2:
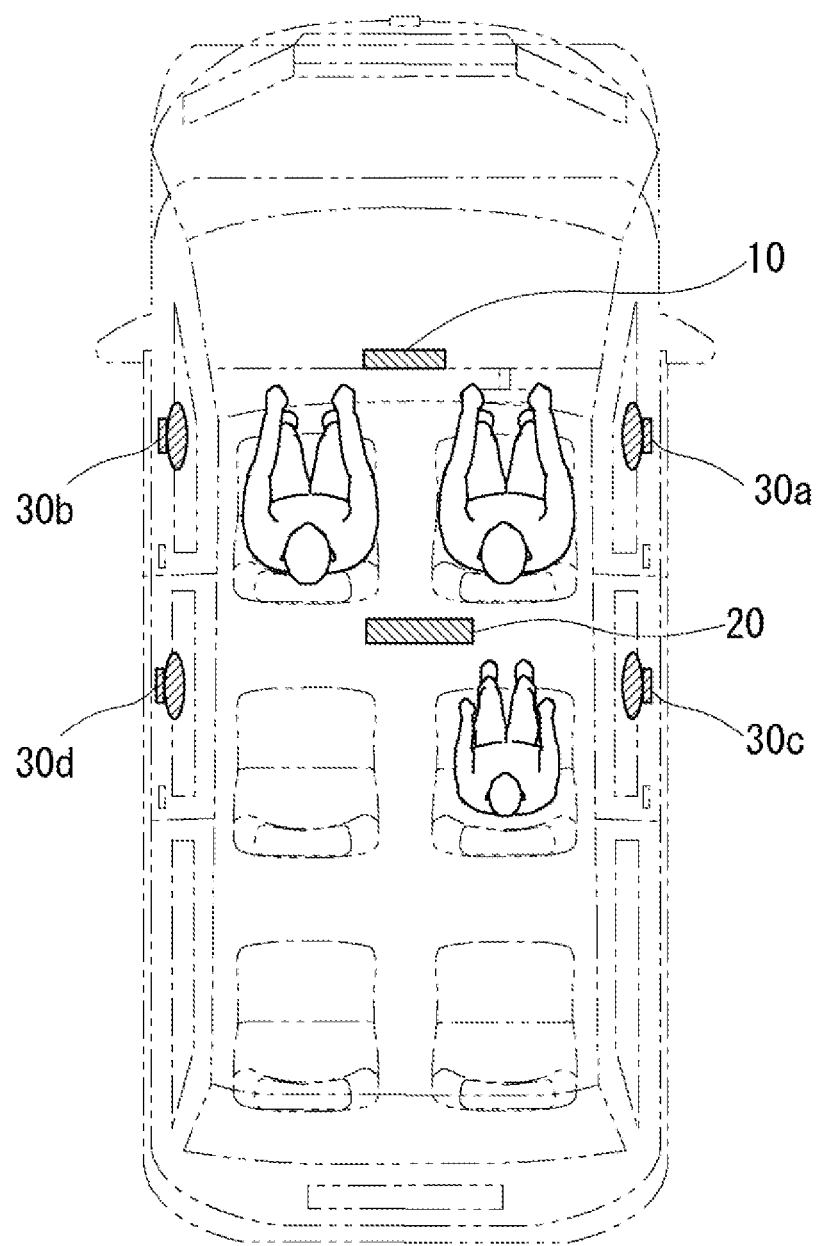
FIG. 2 illustrates an arrangement position of the in-vehicle system.

FIG. 2 illustrates an arrangement position of the in-vehicle system 1 in the vehicle. FIG. 2 illustrates one embodiment of the in-vehicle system 1 mounted in the vehicle such as a minivan for seven people viewed from an upper side. In the embodiment illustrated in FIG. 2, the in-vehicle audio device is provided near a center console arranged in front of the driver's seat of the vehicle. The rear seat display device is provided substantially on a central portion in a vehicle width of a rear seat ceiling in the vehicle. The vehicle speakers 30 include, for example, a vehicle speaker 30*a* provided on the right side of the driver's seat, a vehicle speaker 30*b* provided on a left side of the passenger seat. Furthermore, the vehicle speakers 30 include a vehicle speaker 30*c* provided on a right side of a rear seat behind the driver's seat and a vehicle speaker 30*d* provided on a left side of a rear seat behind the passenger seat. In the vehicle, sound information controlled according to the value of the sound volume adjustment set by the in-vehicle audio device is provided to the occupant through the vehicle speakers 30*a*, 30*b*, 30*c* and 30*d*. The sound signal to which various adjustments (a stepwise increase/decrease of the sound volume level, the balance among the vehicle speakers, the strength of the sound volume level in the reproduced sound range) are made by the HU-ECU 10 is output through the vehicle speakers 30*a*, 30*b*, 30*c* and 30*d*. Hereinafter, the vehicle speakers 30*a*, 30*b*, 30*c* and 30*d* provided on the vehicle body are also collectively referred to as "vehicle speakers 30".

In the in-vehicle audio device, the contents such as a TV broadcast, a video recorded on a DVD, etc., a game, and the like, are provided to the occupant of the vehicle. For the occupant who sits on the driver's seat or the passenger seat, the video of the contents is displayed through a display device such as an LCD included in the in-vehicle audio device, and the sound information (music, sound effect, conversation sound, etc.) of the contents is mainly provided through the vehicle speakers 30*a* and 30*b*. Furthermore, for the occupant who sits on the rear seat behind the driver's seat or the rear seat behind the passenger seat, the video of the contents is displayed through the RSE, and the sound information of the contents is mainly provided through the vehicle speakers 30*c* and 30*d*.

Figure 3:
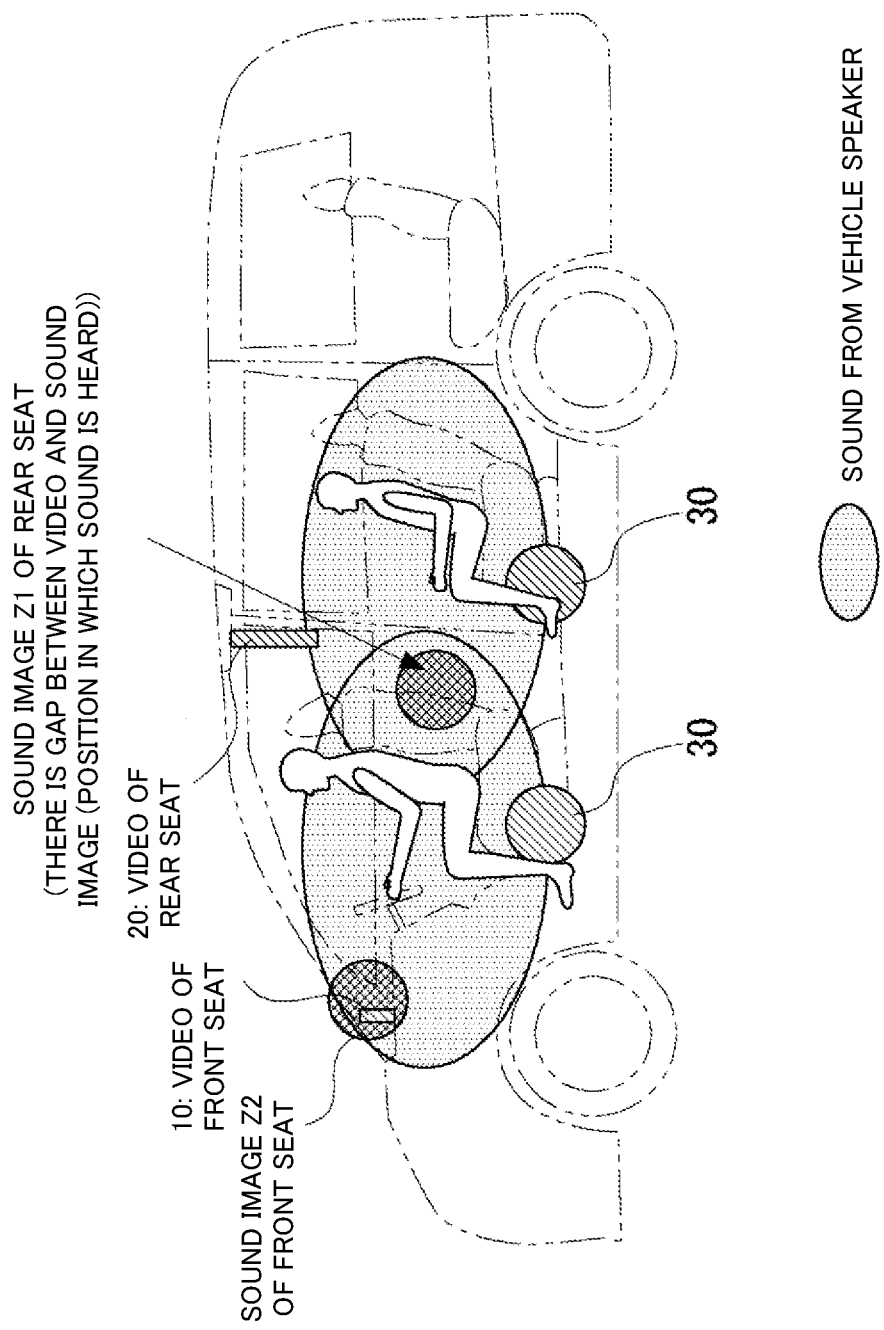
FIG. 3 illustrates a sound image provided by a vehicle speaker.

FIG. 3 illustrates a sound image and video of the contents provided by the vehicle speakers 30. As illustrated in FIG. 3, the vehicle speakers 30 are provided on a lower side of the vehicle body. For the occupant of the driver's seat or passenger seat, the video of the contents such as a TV broadcast or a DVD is provided through the display of the in-vehicle audio device arranged near the center console, and the sound information of the contents is mainly provided through the vehicle speakers 30*a* and 30*b*. As a result, a visual recognition direction of the video of the contents displayed on the display device and a localization area (Z2) of the sound image of the contents provided by the vehicle speakers 30*a* and 30*b* overlap with each other. Thus, it is possible to provide the contents that bring a sense of unity. However, in the rear seat, the rear seat display device is positioned on a ceiling side of the vehicle, and the vehicle speakers 30*c* and 30*d* are positioned on the lower side of the vehicle body. As a result, since the visual recognition direction of the video of the contents displayed through the rear seat display device does not overlap with a localization area (Z1) of the sound image of the contents provided by the vehicle speakers 30c and 30d, there is a weak sense of unity between the video and the sound.

Referring back to FIG. 1, in the in-vehicle system 1 according to this embodiment, the rear seat display device 5 includes the dedicated speaker 20a. The RSE-ECU 20 acquires the sound information that is transmitted through the communication interface 1b together with the video, and outputs the sound information to the speaker (hereinafter, also referred to as "built-in speaker") 20a. Examples of such a speaker include, for example, a display speaker that vibrates a display itself through a vibrating element to emit a sound associated with a video. In the vehicle, since the display speaker is added to the vehicle speakers 30, the sound image in the rear seat is localized near the display on which the video is displayed. As a result, according to this in-vehicle system, it is possible to provide the contents that bring a sense of unity between the video and the sound to the occupant that uses the rear seat display device. The dedicated built-in speaker 20a that is included in the rear seat display device may be a speaker other than the display speaker.

The RSE-ECU 20 according to this embodiment acquires information (VOL information) about a sound volume setting that is set on each of the vehicle speakers 30 from the HU-ECU 10 through the in-vehicle network 1c. The VOL information includes, for example, a VOL step value that increases/decreases the sound volume, and the set value of the fader/balance among the vehicle speakers. Furthermore, when the in-vehicle audio device has an equalizer function, a sound volume setting value in each frequency band for a sound source set by the equalizer may be acquired. The RSE-ECU 20 controls the sound volume to be output from the built-in speaker 20a in conjunction with information about the sound volume setting of the vehicle speakers 30 acquired through the in-vehicle network 1c such as an AVN-LAN.

In the rear seat display device according to this embodiment, even when the sound source (e.g., a fixed line output (−10 dBV), etc.) not in conjunction with a volume operation of the in-vehicle audio device, and the like, is reproduced, the sound volume to be output from the rear seat display device is adjusted in conjunction with the volume operation of the in-vehicle audio device, and the like. That is, it is possible to increase/decrease the sound volume of the built-in speaker 20a of the rear seat display device in conjunction with the volume operation of the in-vehicle audio device. As a result, in the vehicle, it becomes possible to keep an appropriate volume balance between the built-in speaker 20a and other speakers (vehicle speakers 30) for the occupant who views the contents that are provided through the rear seat display device.

Furthermore, since the sound information that is provided to the vehicle speakers 30 and the built-in speaker 20a of the rear seat display device is individually processed, for example, the sound signals suitable for respective acoustic characteristics are provided. For example, by increasing/decreasing a characteristic frequency of the sound to be reproduced according to frequency characteristics of the built-in speaker 20a of the rear seat display device, the RSE-ECU 20 performs an adjustment of the sound in a frequency domain and optimizes sound quality in the rear seat.

In the RSE-ECU 20 according to this embodiment, an adjustable gain value (e.g., increased/decreased by a unit of 3 dBV) or an adjustable offset value may be set for the sound volume setting value of the in-vehicle audio device. The RSE-ECU 20 holds a plurality of VOL curves in which different gain values or offset values are set for the sound volume setting value of the in-vehicle audio device in a memory, etc. The RSE-ECU 20 varies the adjustable gain value or the adjustable offset value according to the sound volume setting value acquired from the HU-ECU 10 and increases/decreases the sound volume to be output from the built-in speaker 20a of the rear seat display device. In this embodiment, it is possible to adjust speaker sound volume of the rear seat display device that increases/decreases in conjunction with the sound volume setting value of the in-vehicle audio device according to preference of the occupant of the rear seat.

Furthermore, in the RSE-ECU 20 according to this embodiment, when different sound sources are reproduced on a front seat side and a rear seat side, the sound volume on the rear seat side may be made larger or smaller than the sound volume on the front seat side compared to when a same sound source is reproduced. For example, the RSE-ECU 20 acquires information indicating that the different sound sources are reproduced on the front seat side and the rear seat side, information indicating a type of the contents and a providing source of the contents through the in-vehicle network 1c. When the different sound sources are reproduced on the front seat side and the rear seat side, the RSE-ECU 20 increases/decreases the sound volume level to be output from the built-in speaker 20a of the rear seat display device according to the type of the contents and the providing source of the contents.

In this embodiment, in the built-in speaker 20a of the rear seat display device, even when the different sound sources are reproduced on the front seat side and the rear seat side, it becomes possible to view the contents to be provided with a sound volume balance suitable for the sound source. For example, when the news is being viewed on the rear seat display, while a music is being provided through the vehicle speakers 30, the sound volume to be output from the built-in speaker 20a is made relatively larger so that an announcement voice is clearly heard. When the music is being provided on the rear seat side, while the news is being viewed on the front seat side, the sound volume to be output from the built-in speaker 20a of the rear seat display 20a is made relatively smaller. For such a sound volume adjustment, for example, an instruction for increasing or decreasing the sound volume level may be notified from the RSE-ECU 20 to the HU-ECU 10 connected through the in-vehicle network 1c. Furthermore, the RSE-ECU 20 may acquire only the information about the sound volume setting (sound control signal) from the HU-ECU 10 connected through the in-vehicle network 1c. When the contents independent of the in-vehicle audio device such as a DVD player included in the rear seat display device or a game machine connected to an external input terminal are reproduced, the RSE-ECU 20 controls the sound volume in the vehicle based on the information about the sound volume setting.

Figure 4:
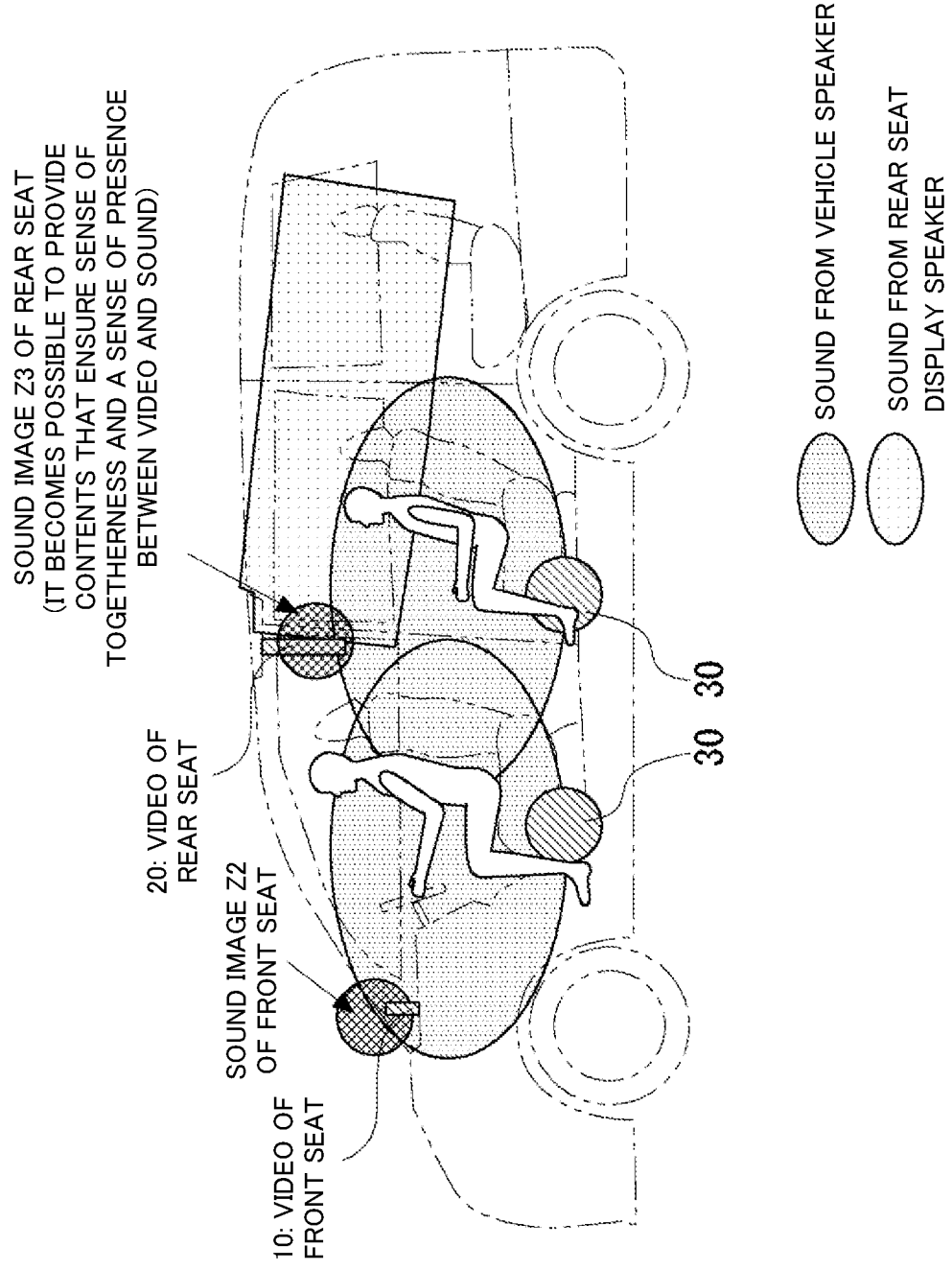
FIG. 4 illustrates a video and the sound image provided by the in-vehicle system according to the embodiment.

FIG. 4 illustrates the video and sound image of the contents to be provided by the in-vehicle system 1 according to this embodiment. In the in-vehicle system 1 according to this embodiment, a sound image Z3 for the occupant of the rear seat is provided to be localized near the built-in speaker 20a by the sound to be output from the built-in speaker 20a of the rear seat display device and the vehicle speakers 30c and 30d. In the rear seat display device, the sound of the contents adjusted in conjunction with the information (VOL information) about the sound volume setting of the in-vehicle audio device acquired from the HU-ECU 10 is output through the built-in speaker 20a. As a result, in the vehicle, it becomes possible to keep the appropriate volume balance between the built-in speaker 20a and other speakers (vehicle speakers 30) for the occupant who views the contents to be displayed on the rear seat display device. According to the in-vehicle system 1 according to this embodiment, it becomes possible to provide the contents that bring a sense of unity and presence between the video and the sound to a user of the rear seat display device.

2. Configuration

Figure 5:
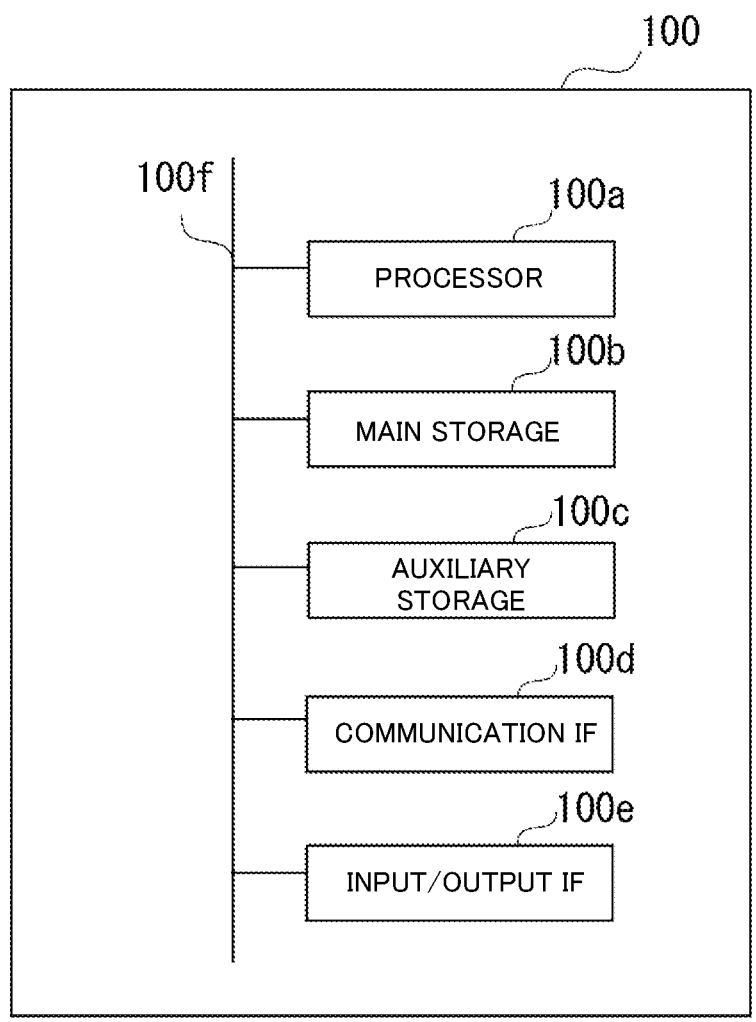
FIG. 5 is a diagram illustrating one example of a hardware configuration of an ECU.

FIG. 5 is a diagram illustrating one example of a hardware configuration of an ECU. The HU-ECU 10 and the RSE-ECU 20 according to this embodiment are implemented by an ECU 100. As illustrated in FIG. 5, the ECU 100 is a computer for control that includes a processor 100a, a main storage 100b, an auxiliary storage 100c, a communication IF 100d, and an input/output IF 100e interconnected by a connection bus 100f as components. In the ECU 100 constituting the HU-ECU 10 and the RSE-ECU 20, a dedicated processor (e.g., DSP, etc.) to provide a sound processing function may be connected to the connection bus 100f. Each of the main storage 100b and the auxiliary storage 100c is a storage medium readable by the ECU 100. A plurality of the components described above may be provided or a part of the components does not have to be provided.

The processor 100a is a central processing unit that controls the entire ECU 100. Examples of the processor 100a include a CPU (Central Processing Unit), an MPU (Micro-Processing Unit), a DSP (Digital Signa Processor), and the like. The processor 100a uses the main storage 100b as a work area to execute a program stored in the auxiliary storage 100c and controls a peripheral device through an execution of the program so as to provide a function according to a predetermined purpose. In this embodiment, the processor 100a of the ECU 100 constituting the RSE-ECU 20 is one example of "controller".

However, one or all of the functions to be provided by the processor 100a may be provided by an ASIC (Application Specific Integrated Circuit), a GPC (Graphic Processing Unit), and the like. Similarly, one or all of the functions may be implemented by a dedicated LSI (large scale integration) such as a FPGA (Field-Programmable Gate Array), a numerical processor, a vector processor, an image processing processor, or the like, and other hardware circuits.

The main storage 100b stores the program to be executed by the processor 100a, data, etc. to be processed by the processor 100a. The main storage 100b includes a flash memory, a RAM (Random Access Memory) and a ROM (Read Only Memory). The auxiliary storage 100c is a storage medium that stores the program to be executed by the processor 100a, the setting information of an operation, and the like. Examples of the auxiliary storage 100c include an HDD (Hard-disk Drive), SSD (Solid State Drive), an EPROM (Erasable Programmable ROM), a flash memory, a USB memory, an SD (Secure Digital) memory card, and the like. The communication IF 100d is a communication interface for connecting the ECU 100 to other devices. In this embodiment, the communication interface such as a GVIF or AVC-LAN is exemplified. However, the communication IF 100d may adopt an appropriate configuration according to a connection system to other devices. The input/output IF 100e is an interface for inputting/outputting the data between an input device and an output device. Video and sound information, etc. of the contents are output to the display of the in-vehicle audio device and the vehicle speakers 30 that are connected to the HU-ECU 10 through the input/output IF 100e. In the RSE-ECU 20, the video information of the contents is output to the display of the rear seat display device through the input/output IF 100e. In this embodiment, the sound information whose sound volume level is adjusted in conjunction with the information about sound settings of the in-vehicle audio device (the VOL step value, the value of the fader/balance, the sound volume setting value for each sound range, etc.) is output to the built-in speaker 20a of the rear seat display device.

3. Processing Flow

Figure 6:
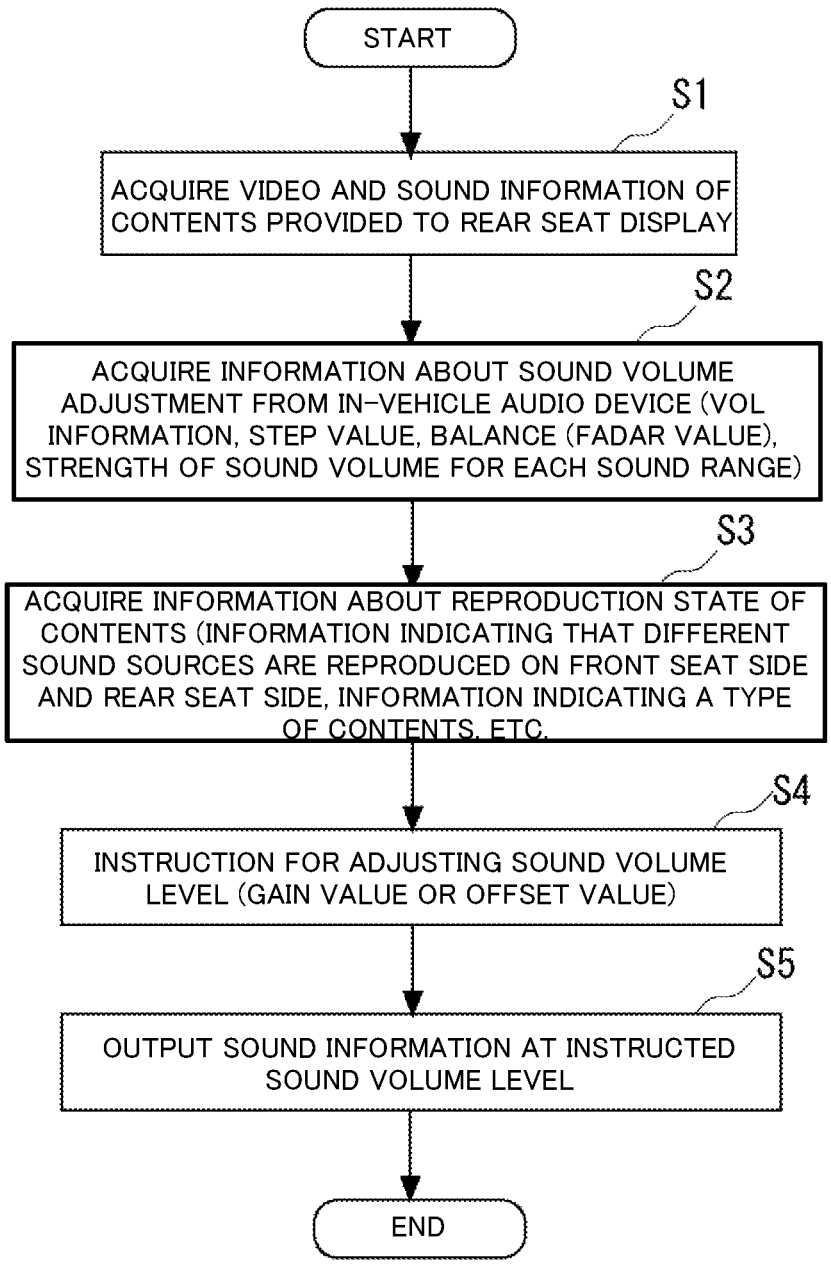
FIG. 6 is a flowchart illustrating one example of a sound volume adjustment processing according to the embodiment.

Next, a processing flow of a sound volume adjustment processing according to this embodiment with reference to FIG. 6. FIG. 6 is a flowchart illustrating one example of the sound volume adjustment processing provided by the RSE-ECU 20 according to this embodiment. In the processing shown in FIG. 6, the processor 100a of the ECU 100 constituting the RSE-ECU 20 executes the program stored in the auxiliary storage 100c, etc.

In the flowchart of FIG. 6, the processing is started when the contents are provided to the rear seat display device. The RSE-ECU 20 establishes a communication with the HU-ECU 10 through the communication interface 1b and the in-vehicle network (AVC-LAN, etc.) 1c. The RSE-ECU 20 acquires the video and sound information, a control signal, etc. of the contents transmitted through the communication interface 1b (a step S1). The RSE-ECU 20 acquires information about the sound volume adjustment from the HU-ECU 10 connected through the in-vehicle network 1c (a step S2). Examples of the information about the sound volume adjustment include the VOL information, information indicating the step value that increases/decreases the sound volume, information indicating a value of the sound volume balance among the vehicle speakers 30 (fader value, etc.), information indicating the strength of the sound volume for each sound range, and the like. The RSE-ECU 20 acquires information about a reproduction state of the contents on the front seat side and the rear seat side (a step S3). Examples of the information indicating the reproduction state of the contents include the information indicating that different contents (sound sources) are reproduced on the front seat side and the rear seat side and the information indicating the type of the contents, etc.

The RSE-ECU 20 notifies an instruction for adjusting the sound volume level of the sound information to be output from the built-in speaker 20a of the rear seat display device to the DSP, etc. that provides the sound processing function according to the acquired information (a step S4). The notification of the sound volume level is performed by the adjustable gain value or the adjustable offset value by a step unit, and the like. It is possible to provide an auxiliary storage, etc. with the adjustable gain value or the adjustable offset value by the step unit as a table value for the VOL information. For example, the adjustable gain value or the adjustable offset value is specified according to the acquired VOL information or the step value, and the value of the sound volume level to be output from the built-in speaker 20a is increased/decreased. Furthermore, the value of the sound volume level to be output from the built-in speaker 20a is increased/decreased according to the acquired balance among the vehicle speakers. For example, when the sound volume of the vehicle speakers (30c, 30d) on the rear seat side is relatively increased, the acquired value of the fader increases the value of the sound volume level to be output from the built-in speaker 20a according to the sound volume level.

Furthermore, for example, the value of the sound volume level to be output from the built-in speaker 20a is increased/decreased according to the acquired strength of the sound volume for each sound range (low sound range, middle sound range, high sound range) for the sound source. For example, when the sound volume in the middle sound range is relatively smaller than the sound volume in other sound ranges, the value of the sound volume level in the middle sound range is decreased. According to the acquired strength of the sound volume for each sound range (low sound range, middle sound range, high sound range) for the sound source, since the characteristic frequency of the sound to be reproduced in accordance with the frequency characteristics of the built-in speaker 20a is increased/decreased, the adjustment of the sound in the frequency domain is performed.

When the different sound sources are reproduced on the front seat side and the rear seat side, the sound volume on a side of the rear seat display device may be made larger or smaller than the sound volume on a side of the in-vehicle audio device compared to when the same sound source is reproduced. For example, when the news is being viewed on the rear seat display, while a music is being provided through the vehicle speakers 30, the sound volume to be output from the built-in speaker 20a is made relatively larger so that an announcement voice is clearly heard. When the music is being provided on the rear seat side, while the news is being viewed on the front seat side, the sound volume to be output from the built-in speaker 20a is made relatively smaller. For such a sound volume adjustment, for example, the instruction for increasing or decreasing the sound volume level may be notified from the RSE-ECU 20 to the HU-ECU 10 connected through the in-vehicle network 1c.

In a step S5, in the RSE-ECU 20, the sound information reproduced at the value of the sound volume level adjusted and set by the processings in the steps S1 to S4 is output to the built-in speaker 20a of the rear seat display device. The contents that bring a sense of unity between the video and the sound in conjunction with the built-in speaker 20a and the vehicle speakers 30 are provided to the occupant of the rear seat who views the contents to be displayed on the rear seat display device. If the processing in the step S5 is finished, the routine temporarily ends.

As described above, in the in-vehicle system 1 according to this embodiment, the in-vehicle rear seat display (RSE) includes the dedicated speaker 20a. The RSE-ECU 20 according to this embodiment acquires the information about the sound volume adjustment set in the in-vehicle audio device from the HU-ECU 10 through the in-vehicle network (e.g., AVC-LAN) 1c. Examples of the information about the sound volume adjustment include the VOL information, the information indicating the step value that increases/decreases the sound volume, the information indicating the value of the sound volume balance among the vehicle speakers 30 (fader value, etc.), the information indicating the strength of the sound volume for each sound range, and the like. Furthermore, the RSE-ECU 20 acquires the information about the reproduction state of the contents on the front seat side and the rear seat side. Examples of the information indicating the reproduction state of the contents include the information indicating that the different contents (sound sources) are reproduced on the front seat side and the rear seat side and the information indicating the type of the contents, etc.

In the in-vehicle system 1 according to this embodiment, the sound volume level to be output from the built-in speaker 20a of the rear seat display device is adjusted in conjunction with the acquired information about the sound volume adjustment. As a result, it becomes possible to keep the appropriate sound volume balance between the built-in speaker 20a and other speakers (vehicle speakers 30) and to provide the contents that bring a sense of unity between the video and the sound to the user of the rear seat display device.

(Others)

The embodiment described above is merely an example, and the embodiment can be appropriately changed and implemented without departing from the purpose of the invention. The processes and units in the embodiment can be freely combined and implemented as long as no technical contradiction occurs.

A process that is described to be executed by one device may be executed by a plurality of devices. Processes described to be executed by different devices may be executed by one device. Which function is to be implemented by which hardware configuration (server configuration) in a computer system may be flexibly changed.

<<Computer Readable Storage Medium>>

A program that causes an information processing apparatus and other machines and devices (hereinafter, referred to as a computer, etc.) to execute the functions of the above embodiment may be stored in a computer-readable storage medium. The functions may be provided by the computer, etc. reading out and executing the program of this storage medium.

Here, the computer-readable storage medium means a storage medium that stores information such as data and programs by electrical, magnetic, optical, mechanical, or chemical action and may be read from the computer, etc. Examples of such a storage medium that can be removed from the computer, etc. include a flexible disk, a magneto-optical disk, a CD-ROM, a CD-R/W, a DVD, a Blu-ray disk, a DAT, an 8 mm tape, and a memory card such as a flash memory card. In addition, the storage medium fixed to the computer, etc. includes a hard disk, a ROM, and the like.

While the invention has been shown and described in detail, the foregoing description is in all aspects illustrative and not restrictive. It is therefore understood that numerous other modifications and variations can be devised without departing from the scope of the invention.

What is claimed is:

1. A rear seat display device provided in a vehicle at a position viewable from a rear seat of the vehicle, the rear seat display device comprising:
    a display;
    a built-in speaker; and
    a controller that (i) acquires a signal relating to control of a sound to be output to a vehicle speaker mounted in the vehicle from an in-vehicle audio device, the vehicle speaker being a different speaker than the built-in speaker, and (ii) controls a sound to be output from the built-in speaker based on the signal relating to the control of the sound,
    wherein the controller of the rear seat display device receives the signal relating to the control of the sound via a communication network different from a communication interface by which the controller receives a sound signal of the sound to be output from the built-in speaker of the rear seat display device.

2. The rear seat display device according to claim 1, wherein
    the built-in speaker is a display speaker in which a surface of the display is directly vibrated to emit the sound.

3. The rear seat display device according to claim 1, wherein
    the controller has an adjustable gain value or an adjustable offset value capable of being set to a plurality of stages and further controls the sound to be output from the built-in speaker using the gain value or the offset value.

4. The rear seat display device according to claim 3, wherein
when the sound to be output from the built-in speaker is different from the sound to be output to the vehicle speaker by the in-vehicle audio device, the controller executes at least one of increasing the gain value or the offset value and notifying an instruction for decreasing a set value of a sound volume to be output from the vehicle speaker to the in-vehicle audio device.

5. An in-vehicle system comprising:
a rear seat display device provided in a vehicle at a position viewable from a rear seat of the vehicle; and
an in-vehicle audio device that outputs contents to the rear seat display device, wherein
the rear seat display device includes:
 a display;
 a built-in speaker; and
 a controller that (i) acquires a signal relating to control of a sound to be output to a vehicle speaker mounted in the vehicle from the in-vehicle audio device, the vehicle speaker being a different speaker than the built-in speaker, and (ii) controls a sound to be output from the built-in speaker based on the signal relating to the control of the sound, wherein
 the controller of the rear seat display device receives the signal relating to the control of the sound via a communication network different from a communication interface by which the controller receives a sound signal of the sound to be output from the built-in speaker of the rear seat display device.

6. A control method comprising the steps of:
(a) acquiring a signal relating to control of a sound to be output to a vehicle speaker mounted in a vehicle from an in-vehicle audio device that outputs contents to a rear seat display device provided in the vehicle at a position viewable from a rear seat of the vehicle, the acquiring being performed by a controller of the rear seat display device; and
(b) the controller of the rear seat display device controlling a sound to be output from a built-in speaker of the rear seat display device based on the signal relating to the control of the sound output from the in-vehicle audio device, the built-in speaker being a different speaker than the vehicle speaker,
wherein the controller of the rear seat display device receives the signal relating to the control of the sound via a communication network different from a communication interface by which the controller receives a sound signal of the sound to be output from the built-in speaker of the rear seat display device.

* * * * *